United States Patent [19]

Fowler

[11] 4,020,662
[45] May 3, 1977

[54] SHACKLE FOR SECURING VEHICLE STEERING COLUMN IGNITION LOCK AGAINST BURGLARY

[76] Inventor: Harry H. Fowler, 70 Fresh Pond Parkway, Cambridge, Mass. 02138

[22] Filed: Aug. 22, 1975

[21] Appl. No.: 606,962

[52] U.S. Cl. .................................... 70/237; 70/18; 200/44; 200/61.54
[51] Int. Cl.² ................. B60R 25/00; H01H 9/28
[58] Field of Search ............ 70/237, 18, 158, 163, 70/164, 166, 167, 209, 211, 212, 423, 424, 425, 426, 427, 428; 200/44, 45, 61.54

[56] References Cited
UNITED STATES PATENTS

| | | | |
|---|---|---|---|
| 1,359,213 | 11/1920 | Welch | 70/18 X |
| 1,421,020 | 6/1922 | Miller | 70/211 |
| 1,428,649 | 9/1922 | Miller | 70/211 |
| 1,444,161 | 2/1923 | Arnold | 70/18 |
| 1,566,668 | 12/1925 | Glass | 70/18 X |
| 2,191,808 | 2/1940 | Schramm | 248/231 UX |
| 3,811,303 | 5/1974 | Robertson | 70/237 |
| 3,888,096 | 6/1975 | Huss | 70/209 |

*Primary Examiner*—J. Franklin Foss
*Attorney, Agent, or Firm*—Morse, Altman, Oates & Bello

[57] ABSTRACT

A shackle for preventing tampering with the ignition lock on an automotive steering column comprises a collar and a cap. The collar envelops the steering column and has a gap at the ignition lock. The cap selectively is locked to the collar over the ignition lock or is freed to provide access to the ignition lock through the gap.

2 Claims, 4 Drawing Figures

SHACKLE FOR SECURING VEHICLE STEERING COLUMN IGNITION LOCK AGAINST BURGLARY

BACKGROUND OF THE INVENTION

1. Field of the Invention

The present invention relates to automotive vehicle security and, more particularly, to the prevention of theft of automotive vehicles of the type having a locking ignition switch mounted on the steering column below the steering wheel.

2. The Prior Art

Typically, such an ignition lock is positioned at the right of the steering column below the steering wheel. Typically, approximately 180° from the ignition lock about the steering column is a direction signal lever which extends to the left below the steering wheel. Typically, somewhat below the ignition lock on the steering column is a warning signal flasher switch. Although such ignition locks are intended to prevent burglary, they ordinarily can be forcibly detached from the steering column in such a way as to expose the ignition terminals and to permit unauthorized starting of the vehicle engine.

SUMMARY OF THE INVENTION

The primary object of the present invention is, not only to prevent forcible removable of the steering column ignition lock, but moreover to completely prevent access to it when the vehicle is not in authorized use. This object is achieved by a shackle having: (1) a collar that permanently envelops the steering column securely and that has a gap by which the ignition lock may be accessible; and a cap that precludes access to the ignition lock when secured to the collar and that enables normal use of the ignition lock when removed from the collar; the collar and the cap having fixed and movable interracting flanges that are hidden when in locked condition to resist jimmying, prying and other burglarizing techniques. One of these flanges is under the control of a coaxial tumbler lock on the cap that is controlled outside the cap by a cylindrical key.

Other objects of the present invention will in part be obvious and will in part appear hereinafter.

The invention accordingly comprises the product, together with its components, which are exemplified in the following disclosure, the scope of which will be indicated in the appended claims.

BRIEF DESCRIPTION OF THE DRAWINGS

For a fuller understanding of the nature and objects of the present invention, reference is to be made to the following detailed description, taken in connection with the accompanying drawings, wherein.

DETAILED DESCRIPTION OF THE PREFERRED EMBODIMENTS

Figure 1:
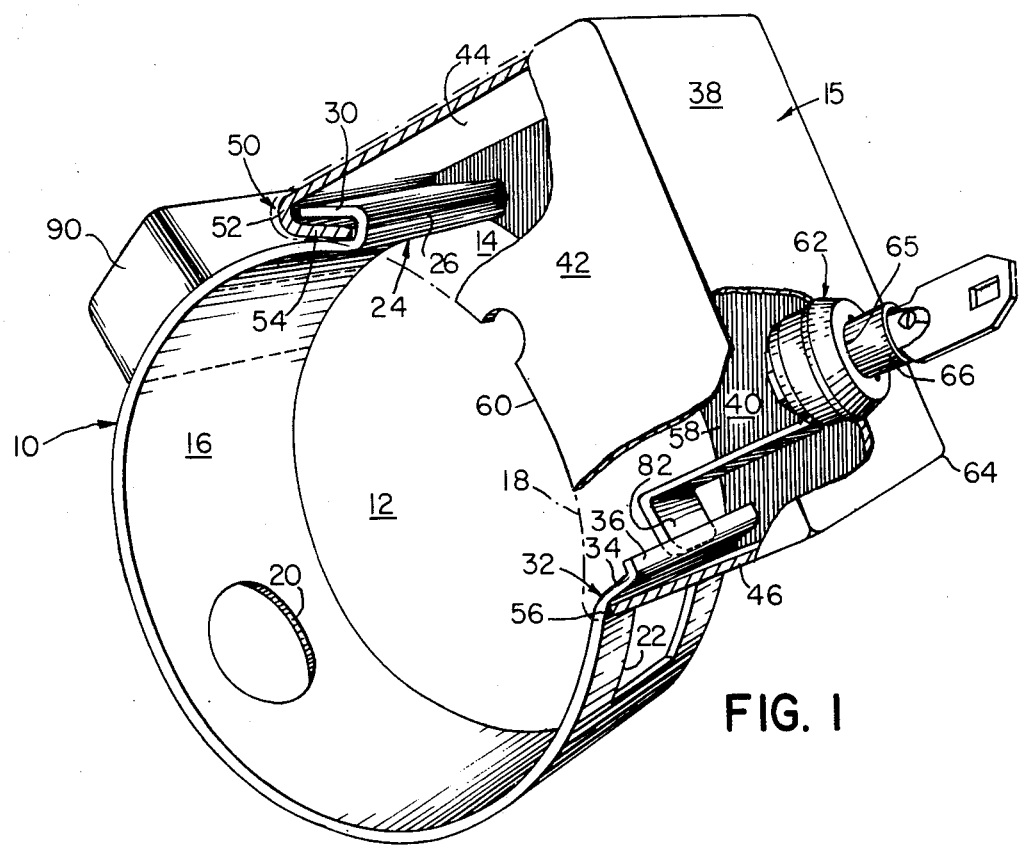
FIG. 1 is a perspective view of a security device embodying the present invention in locked condition.

The security device of the present invention, as illustrated in FIG. 1, comprises: (1) a collar 10 which snugly and permanently clasps a steering column axially positioned at 12 and which has a gap in the vicinity of the steering column ignition lock at 14; and (2) a cap 15 which shields the ignition lock from access when in locked condition and which renders the ignition lock accessible when in unlocked condition. Preferably, the collar and the cap are composed of cold rolled steel ranging in thickness from 0.03 to 0.30 inch (0.075 to 0.75 centimeter) in axial length from 1 to 3 inches (2.5 to 7.5 centimeters) and all internal corners of the cap are welded so that all external corners of the cap are clear.

As shown, collar 10 is developed along a theoretical axis about a theoretical cylindrical surface of revolution with a portion 16 that extends through an arc that is greater than 180° and with a gap 18 that extends through an arc that is less than 180°. Portion 16 has a substantially medial opening 20 through which the directional signal lever can project from the steering column. Also portion 16 has a substantially off center opening 22 through which typically an emergency light flasher button can project. Medial portion 16 is of uniform thickness throughout its circumferential and axial extent. At one extermity of arcuate portion 16 is a first catch 24 having an intermediate bight portion 26 that extends outwardly from the tubular surface of revolution of arcuate portion 16 and a reversed flange portion 30 that extends generally along and spaced from the surface of revolution of arcuate portion 16. Bight 26 and flange 30 both are of approximately the same paraxial length and thickness as arcuate portion 16. At the other extremity of arcuate portion 16 is a second catch 32 having an intermediate extension portion 34 that extends outwardly from the tubular surface of revolution of arcuate portion 16 and a flange portion 36 that extends generally along and spaced from the surface of revolution of arcuate portion 16. Extension portion 34 and flange portion 36 both are of approximately the same paraxial length and thickness as arcuate portion 16. Flange portion 30 and flange portion 36, as seen in FIG. 1, both extend in a counter-clockwise direction.

Cap 15 includes: an outer panel 38 generally disposed in a theoretical plane that is generally parallel to the axis of arcuate portion 16; a first pair of parallel panels 40, 42 that are disposed in theoretical planes that are generally perpendicular to the axis of arcuate portion 16; and a second pair of parallel panels 44, 46 that are disposed in theoretical planes that are generally parallel to the axis of arcuate portion 16. All of panels 40, 42, 44, 46 generally are disposed in planes that are perpendicular to outer panel 38. Panels 38, 40, 42, 44, 46 are integrally stamped from a single blank and their non-integral corners are internally welded to provide a plurality of edges. The outer joints of these edges are formed by smooth surfaces disposed in planes that intersect in clean angles with each other so as not to provide any seam which could be jimmied or pried.

At the lower extremity of panel 44 is a catch 50 which includes a bight portion 52 and a flange portion 54. At the lower extremity of panel 46 is a straight edge portion 56. At the lower edges of panels 40, 42 are arcuate edge portions 58, 60, each having the same radius of curvature as the inner surface of arcuate portion 16 of collar 10. It will be observed that the extreme lower corners of panels 40, 42 overlap and encompass catch portions 32, 24 of collar 10. Projecting through and mounted on panel 38 is an axial tumbler lock 62 which has a tubular key hole 64 for a tubular key 66. Lock 62 includes outer and inner shoulders 68, 70, by which the lock is fixed to panel 38, and a rotatable output shaft 72 which is controlled by key 66. Mounted for movement with shaft 72 is a catch 74 which includes: an annular washer portion 76 that is locked to shaft 72 by a nut 78; a leg portion 80 that extends along the line that is spaced from and approximately perpendicular to the axis of collar 16; and a foot portion 82 that extends along a line that is approximately perpendicular to the line of leg portion 80. When catch portions 24, 50 are engaged and edge portion 56 is superposed against intermediate extension portion 34, rotation of key 66 causes the outer face of foot portion 82 to pivot into engagement with and out of engagement from the inner face of flange portion 36, thereby locking cap 15 to collar 10 at gap 18 or permitting its removal and the disengagement therefrom. When the cap is in locked condition, as seen in FIG. 1, flange portion 54 and foot portion 82 project generally in a clockwise direction about the axis of arcuate portion 16.

OPERATION

Figure 2:
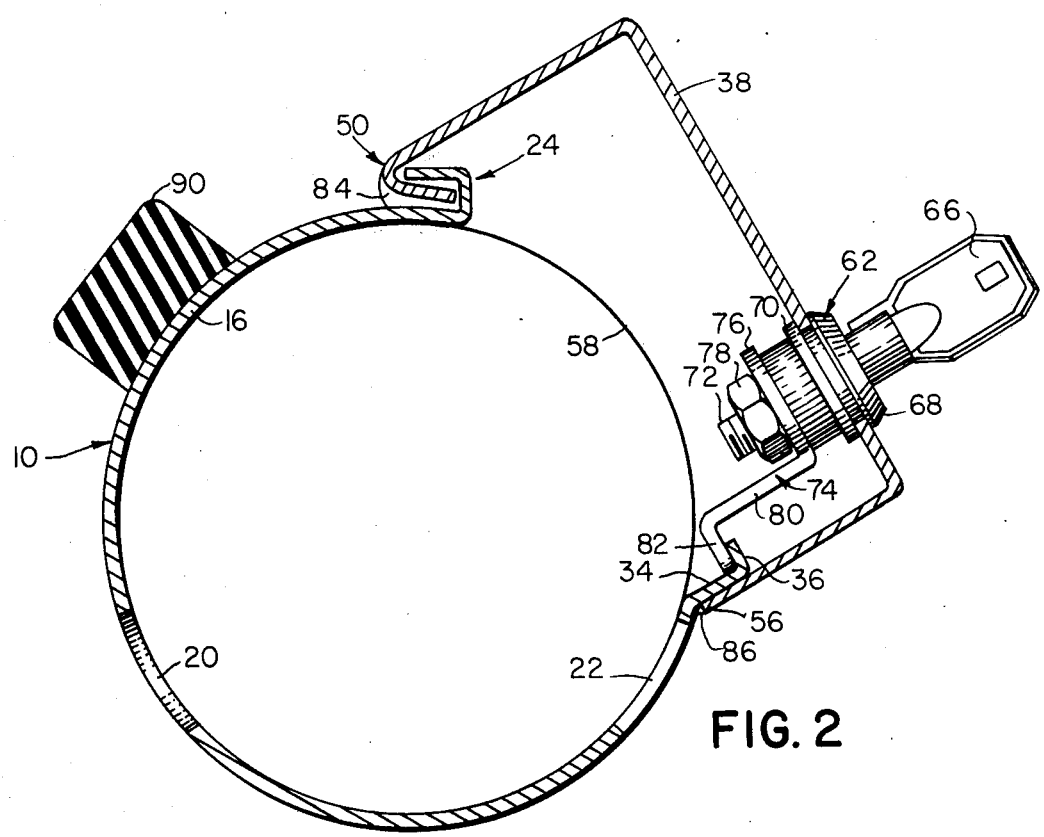
FIG. 2 is a cross sectional view of the security device of FIG. 1, the section being taken along a plane through the center of the device and perpendicular to its axis.
Figure 3:
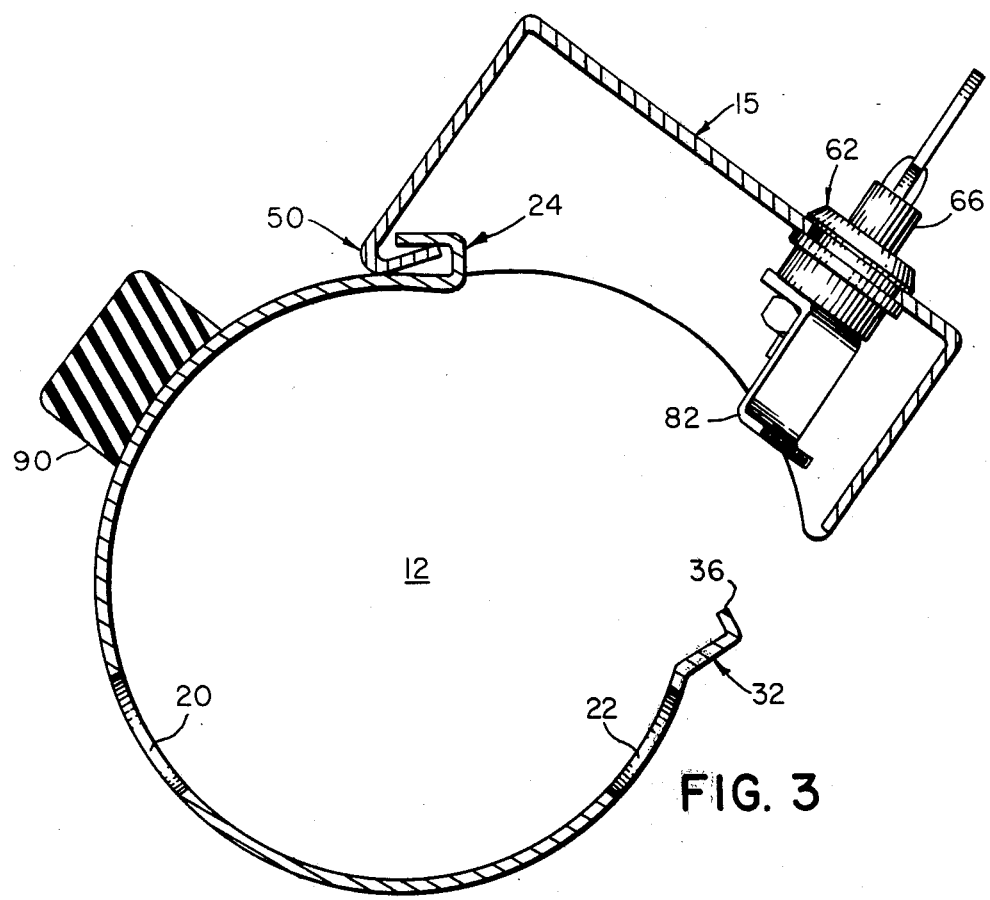
FIG. 3 is a cross sectional view, analogous to that of FIG. 2, showing the security device in partially opened position.
Figure 4:
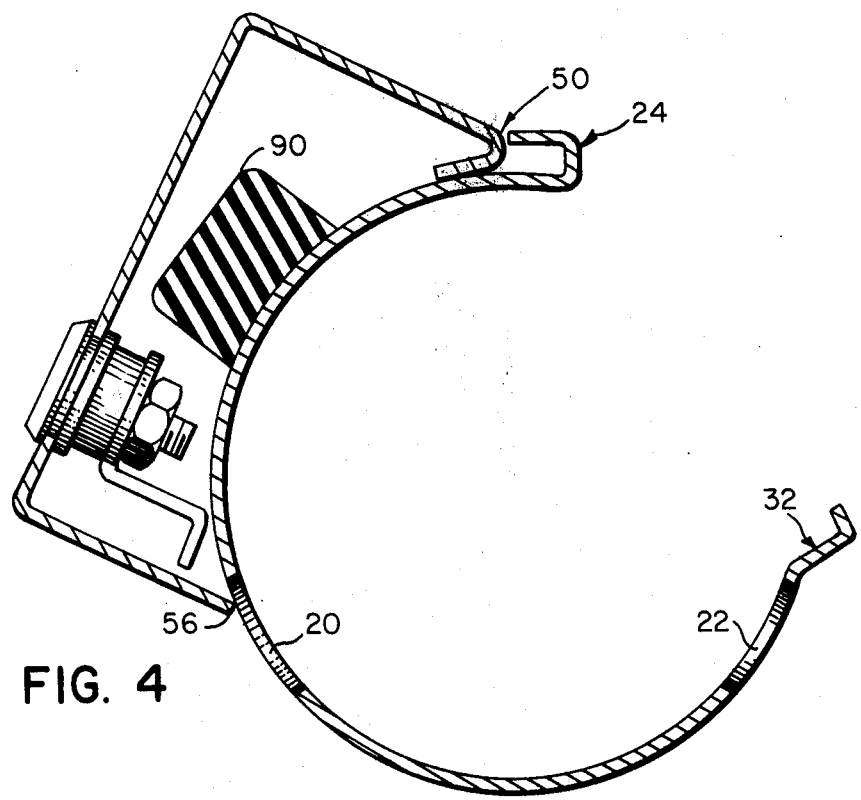
FIG. 4 is a cross sectional view, analogous to that of FIG. 2, showing the security device in opened condition.

As shown in FIGS. 2, 3, when catch portion 50 and catch portion 24 are engaged, edge portion 56 abuts against intermediate extension portion 34 along the line at which intermediate extension portion 34 bends outwardly from arcuate portion 16. Under these circumstances, the outer surface of foot 82 abuts against the inner surface of flange portion 36 when lock 62 is secured and is free of the inner surface of flange portion 36 when lock 62 is unsecured. In the former case, edge portions 60, 58 form continuations of the circular profiles of the inner surface of arcuate portion 16 of collar 10. In the former case also the extreme lower corners of panels 40, 42, shown at 84, 86 in FIG. 2, straddle catch portions 50, 24, edge portion 56 and catch portion 32. When lock 62 is unsecured, foot 82 is turned out of engagement from foot 36 so that cap 15 can be pivoted outwardly about bight 52 of catch 50 and edge portion 56 can be separated from intermediate extension portion 34. Once edge portion 56 is free of catch 32, the cap can be disengaged entirely from the collar by sliding catch portions 50, 24 out of engagement. It will be observed that when cap 15 is secured to collar 10, the plane of flange portion 54 and the plane of flange portion 30 subtend a small acute angle to enable pivotal movement of the cap with respect to the collar as in FIG. 3. When completely disengaged, as shown in FIG. 4, the cap can be mounted in storage location by a friction fit over a rubber pillow 90 affixed to arcuate portion 16.

The present invention thus provides a security device for preventing burglarly in automotive vehicles by preventing removal of and tampering with the steering column ignition lock. The arrangement is such that the collar and cap, when in secured condition, leave almost no accessible reentrant regions by which burglarly tools might be inserted and applied. Since certain changes may be made in the foregoing disclosure without imparting from the scope thereof, it is intended that all matter described in the foregoing specification or shown in the accompanying drawings be interpreted in an illustrative and not in a limiting sense.

What is claimed is:

1. A security device for association with the steering column ignition lock of an automotive vehicle, said security device comprising:
   a. a collar for connection to said steering column, said collar having an arcuate portion, a gap for access to said ignition lock, a first connector and a second connector at said gap;
   b. a cap for covering said gap when secured and for uncovering said gap when unsecured, said cap having a third connector for engaging said first connector of said collar and a chamber that is registered with said gap when said cap is secured;
   c. a lock carried by said cap, said lock having a fourth connector under the control of a key, said fourth connector being engaged with said second connector when secured and being disengaged from said second connector when unsecured;
   d. when said security device is in locked condition, said first connector and said third connector projecting in one direction, and said second connector and said third connector projecting in the opposite direction;
   e. said first connector and said second connector being affixed to said collar;
   f. said third connector being affixed to said cap;
   g. said lock including a cylindrical key receptacle, a cylindrical key, a rotatable shaft controlled by said key, and a foot mounted on said rotatable shaft, said foot engaging said second connector when said collar and said cap are in locked condition;
   h. said cap enclosing said first connector and said second connector when said collar and said cap are locked;
   i. said first connector including an intermediate bight portion and a flange portion and said second connector including an intermediate bight portion and a flange portion, said flange portion of said first connector and said flange portion of said second connector extending in the same direction;
   j. said third connector means including a bight portion and a flange portion, said flange portion of said third connector and said foot portion of said lock extending in the same direction when said collar and said cap are in locked condition.

2. A security device for association with the steering column ignition lock of an automotive vehicle, said security device comprising:
   a. a collar for connection to said steering column, said collar having an arcuate portion, a gap for access to said ignition lock, and a first catch and a second catch at said gap;
   b. a cap for covering said gap when secured and for uncovering said gap when unsecured, said cap having a third catch for engaging said first catch for said collar and a chamber that is registered with said gap when said cap is secured;
   c. a lock carried by said cap, said lock having a fourth catch under the control of a key, said fourth catch being engaged with said second catch when secured and being disengaged from said second catch when unsecured;
   d. said collar and said cap being composed of steel;
   e. when said security device is in locked position, said first catch and said third catch projecting in one direction and said second catch and said third catch projecting in the opposite direction;
f. said first catch and said second catch being integral with said collar;
g. said third catch being integral with said cap;
h. said lock including cylindrical key receptacle means, cylindrical key means, rotatable shaft means controlled by said key means, and a foot mounted on said rotatable shaft means, said foot engaging said second catch when said collar and said cap are in locked condition;
i. said cap enclosing said first catch, said second catch, said third catch and said foot when said collar and said cap are locked;
j. said first catch including an intermediate bight portion and a flange portion and said second catch including an intermediate bight portion and a flange portion, said flange portion of said first catch and said flange portion of said second catch extending in the same direction;
k. said third catch including a bight portion and a flange portion, said flange portion of said third catch means and said foot portion of said lock means extending in the same direction when said collar and said cap are in locked condition; and
l. certain free edges of said cap and the inner surface of said collar being disposed along a theoretical tubular surface;
m. said steel being cold rolled and ranging in thickness from 0.075 to 0.75 centimeter and in axial length from 2.5 to 7.5 centimeters;
l. said collar extending more than 180° about said steering column.

* * * * *